Oct. 28, 1924.
G. F. KOLB
1,513,047
BUMPER
Filed Feb. 28, 1924
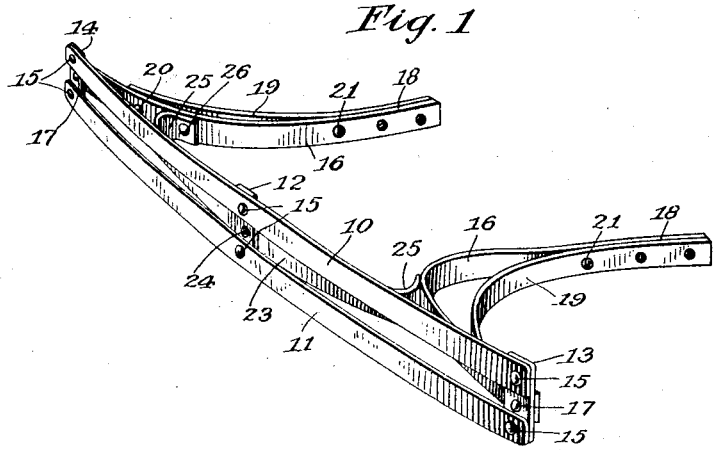
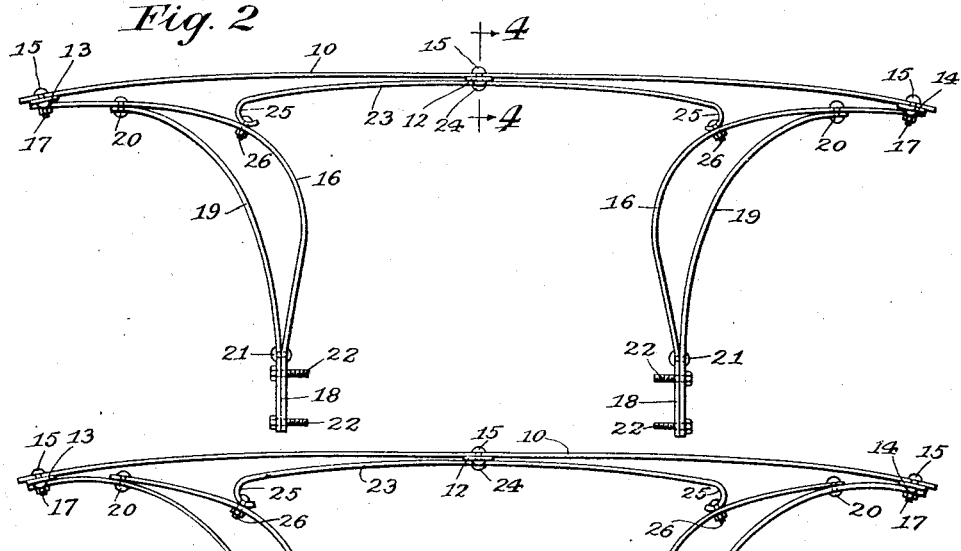
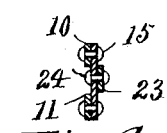
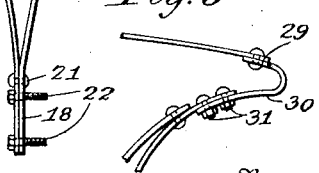
Inventor
George F. Kolb
By Chamberlain & Newman
Attorneys Patented Oct. 28, 1924.

1,513,047

UNITED STATES PATENT OFFICE.

GEORGE F. KOLB, OF FAIRFIELD, CONNECTICUT, ASSIGNOR TO THE BULLARD MACHINE TOOL CO., OF BRIDGEPORT, CONNECTICUT, A CORPORATION OF CONNECTICUT.

BUMPER.

Application filed February 28, 1924. Serial No. 695,644.

*To all whom it may concern:*

Be it known that GEORGE F. KOLB, a citizen of the United States, and resident of Fairfield, in the county of Fairfield and State of Connecticut, has invented certain new and useful Improvements in Bumpers, of which the following is a specification.

This invention relates to a bumper for automobiles, and has for an object to provide a structure of this character of simple construction, which may be conveniently attached to the automobile frame, and which will be effectual in withstanding and absorbing shocks and protecting the automobile from collisions.

In particular, it is proposed to provide a bumper of great strength, and of such resiliency as to absorb and repel shocks either applied straight-on or at an angle. A further object is to provide a structure having cooperating resilient and supporting elements adapted to produce a bumper of adequate strength and resiliency, and one which will be free from vibration generated through the movement of the automobile.

With the above and other objects in view, an embodiment of the invention is shown in the accompanying drawings, and this embodiment will be hereinafter more fully described with reference thereto, and the invention will be finally pointed out in the claims.

In the drawings:

Fig. 1 is a perspective view of a bumper, according to the present embodiment of the invention;

Fig. 2 is a plan view thereof;

Fig. 3 is a plan view of a slightly modified form of construction;

Fig. 4 is a sectional view taken along the line 4—4 of Fig. 2; and

Fig. 5 is a fragmentary plan view of the end portion of a further modified form.

Similar reference characters indicate corresponding parts throughout the several figures of the drawings.

Referring to the drawings, the bumper according to the present embodiment of the invention comprises a pair of front impact bars 10 and 11, disposed in vertically spaced alignment with each other and slightly bowed; and being connected centrally and at their ends by vertical clips or bars 12, 13 and 14 secured by rivets 15. The impact bars are preferably formed of springy steel bars.

Duplex resilient supporting means are provided at each end of the impact section, and each comprises a bowed strap steel bar 16, bolted as at 17 to the intermediate portion of the end clip, and curved inwardly and rearwardly, its inner end being straightened, as at 18, for attachment to the automobile frame. The curvature of the bars 16 is such that they diverge inwardly from the impact bars 10 and 11, and the rearwardly curved portions project substantially within straight parallel lines drawn forwardly from the attaching portions 18. A bowed reinforcing resilient bar 19 is secured by a rivet 20 to the rear side of the bar 16, in inwardly spaced relation to the end, and extending into overlying relation with the attaching portion 18, where it is secured by a rivet 21, the curvature of the bar 19 being less than that of the bar 16, so that a substantially crescent-shaped space is provided between them.

The rear ends of the bars 16 and 19 are adapted to be attached to the sides of the automobile frame by means of bolts 22 provided therein.

At the rear side of the impact section, a resilient brace bar 23 is secured to the intermediate portion of the clip 12 by means of a rivet 24, being bowed rearwardly and curved at its ends, as at 25, where it is secured to the bars 16 by bolts 26. The impact section is thus effectually supported to withstand shocks applied substantially in the center thereof, while shocks applied at the ends or at an angle are opposed by the duplex end supports, one supplementing and compensating the action of the other.

In Fig. 3 there is shown a slightly modified form of construction, similar to the first form, except that in the duplex supporting means the outer curved bar 27, corresponding to the bar 19 of the first form, is extended at its forward end and secured to the end of the impact section, while the inner curved bar 28 is secured to the forward side of the bar 27 in inwardly spaced relation to its end.

In Fig. 5 there is shown a further modified form of construction, in which the end clips 29 of the impact section are provided with a curved extension 30, projecting outwardly with respect to the end of the impact section to provide a rounded end, and curved inwardly and rearwardly, where it is bolted, as at 31, to the forward end of the duplex supporting means.

I have illustrated and described preferred and satisfactory embodiments of the invention, but it is obvious that changes may be made therein, within the spirit and scope thereof, as defined in the appended claims.

Having thus described my invention, what I claim and desire to secure by Letters Patent is:

1. A bumper comprising a forward impact section, and supporting portions at each side each comprising an inwardly curved bar having one end attached to the impact section and the other end adapted to be attached to the automobile frame, and another curved bar of different curvature secured at its ends to said first bar.

2. A bumper comprising a forward impact section, and supporting portions at each side comprising duplex resilient bars of substantially crescent shape in their plan outline, said portions being secured at one end to the ends of the impact section and adapted to be secured at their other ends to the automobile frame.

3. A bumper comprising a forward impact section, supporting portions at each side comprising an inwardly curved bar having one end attached to the impact section and the other end adapted to be attached to the automobile frame, and another curved bar of different curvature secured at its ends to said first bar, said supporting portions diverging rearwardly with respect to said impact section, and a brace bar secured at its ends to said supporting portions and engaging the rear side of said impact section substantially centrally thereof.

4. A bumper comprising a forward impact section comprising a pair of bowed resilient bars aligned with each other and vertically spaced, connection means between said bars at their ends, and supporting portions at each side comprising an inwardly curved bar having one end attached to the intermediate portion of said end connection means and the other end adapted to be attached to the automobile frame, and another curved bar of different curvature secured at its ends to said first bar.

5. A bumper comprising a forward impact section comprising a pair of bowed resilient bars aligned with each other and vertically spaced, connection means between said bars at their ends and centrally, supporting portions at each side comprising an inwardly curved bar having one end attached to the intermediate portion of said end connection means and the other end adapted to be attached to the automobile frame, and a brace bar attached centrally to the intermediate portion of said central connection means and attached at its ends to said supporting portions.

6. A bumper comprising a forward impact section, and duplex supporting portions secured at each end of said impact section and each comprising an inner bowed bar adapted to have its inner end secured to the automobile frame and having its curvature diverging rearwardly and inwardly with respect to said impact section and extending within a straight line extending forwardly from its attaching end, and an outer bowed member of less curvature secured at its ends to said inner bowed bar.

Signed at Bridgeport, in the county of Fairfield and State of Connecticut, this 27th day of February, A. D., 1924.

GEORGE F. KOLB.

Witnesses:
T. S. PENDAGAST,
M. E. MCCARTHY.